Inventor:
William W. Piper,
by Paul A. Frank
His Attorney

United States Patent Office 2,698,915
Patented Jan. 4, 1955

2,698,915

PHOSPHOR SCREEN

William W. Piper, Schenectady, N. Y., assignor to General Electric Company, a corporation of New York Application April 28, 1953, Serial No. 351,600

13 Claims. (Cl. 315—362)

This invention relates to a phosphor screen, and particularly to an electroluminescent phosphor screen suitable for use as information display screens.

Electroluminescent cells, or luminous capacitors as they have been called, consist of parallel plate electric conductors with a suitable electroluminescent phosphor disposed therebetween. Normally, one of the conducting surfaces is transparent. When such an electroluminescent cell is subjected to an alternating current field, the phosphor emits visible radiation. The intensity of light given off by an electroluminescent cell is a function of the applied voltage as well as the frequency of the applied potential. The intensity varies quadratically with the voltage within certain limits, but as the frequency is increased a point is reached where higher frequencies do not increase the intensity.

The conducting surfaces of an electroluminescent cell do not have to be flat surfaces of large area. Thin conductors, such as wires, may also be used in constructing electroluminescent cells. In this event, the emitted light is concentrated at the point, or points, where the conducting wires are near each other. If a pair of conductors cross each other at a single point, light from a phosphor separating the conductors will be confined to the immediate vicinity of this point. If an electroluminescent cell is fabricated with a system of crossed grid conductors, it would appear that selectively energizing the crossed grid network would be a means of defining a picture or displaying information, as in a TV tube or a cathode-ray oscilloscope. The drawback to this approach lies in the fact that the electric field applied in order to obtain the necessary brightness is so large that neighboring areas are excited to emit light which cuts down the definition.

Accordingly, it is an object of this invention to provide an electroluminescent cell type of phosphor screen having good definition and brightness characteristics.

It is another object of the invention to provide a device for displaying information which utilizes an electroluminescent cell as the phosphor screen.

It is a further object of this invention to provide an electroluminescent cell phosphor screen composed of a phosphor in which a threshold exciting potential must be exceeded before substantial light emission occurs.

Briefly stated, in one of its aspects, this invention is directed to a phosphor screen comprising a first grid of spaced parallel conductors, a second grid of spaced parallel conductors spaced in electrically insulated relationship with the first grid, the conductors of the second grid running at substantially a right angle to the conductors of the first grid, and a phosphor layer positioned between the grids, the phosphor being composed of an electroluminescent phosphor emitting light in phase with the applied voltage.

I have discovered that electroluminescent cells utilizing phosphors from the zinc and cadmium sulfoselenide group give off light pulses from 40 to 140 electrical degrees out of phase with respect to the peak voltage when subjected to moderate alternating current voltages. At higher voltages, light pulses in phase with the peak voltage are produced. The rate of change of light output with respect to the root-mean-square voltage is considerably smaller for the out-of-phase component than for the in-phase component of light. It has been postulated that in-phase light is produced by electrons tunnelling through the barrier from the cathode. Out-of-phase light is produced by electrons originating within the crystal which are coupled with the applied voltage by the high impedance capacity of the cathode barrier. While this explanation of the observed phenomena may or may not be correct, the fact remains that the intensity of emitted light does not increase linearly with applied voltage over the entire range. As soon as the voltage threshold wherein in-phase light is emitted is crossed, the light output increases at a much more rapid rate than it did below this threshold. While this threshold voltage varies depending upon the phosphor materials and the grid materials it is normally within a range of 200 to 800 volts. Above the threshold voltage the intensity of emitted light increases substantially exponentially with applied voltage. As used hereinafter, the voltage at which the in-phase component of light begins emission will be termed the "in-phase emission threshold voltage."

Properly activated zinc fluoride also is a satisfactory electroluminescent phosphor for use in a crossed grid type of phosphor screen. For this phosphor there is no out-of-phase emission and the in-phase emission threshold voltage is within a range of 1000–2000 volts potential. These phosphors, which are preferably activated with 1% to 6% by weight of manganese, thallium, cerium, or lead, may be produced by heating zinc fluoride powder, for example, together with an activator and 1% to 5% ammonium fluoride in a platinum crucible until fusion is reached. Such fluoride phosphors are further disclosed in Piper and Johnson application Serial No. 303,566, assigned to the same assignee as the present application.

Since the emission of light from an electroluminescent cell is not very great at a potential below the in-phase emission threshold voltage, a crossed-grid electroluminescent cell will emit a concentrated spot of light at just the energized crossing provided the exciting potential only slightly exceeds the in-phase emission threshold voltage. In this event, in-phase light will be produced at the crossing, while the electric field at adjoining crossings will be at too low a potential for these crossings to emit other than out-of-phase light. While the exact excess of voltage permitted over the linear emission threshold voltage depends upon the spacing of the conductors, in most cases the linear emission threshold voltage may be exceeded by about 40% before adjoining conductor crossings emit in-phase light. Ideally, the excess voltage to be applied is that voltage wherein adjoining conductor crossings are excited in the range between the in-phase emission threshold and the highest value of voltage which would leave adjacent crossings below the in-phase emission threshold voltage. This would yield maximum contrast. Variation of the voltage between these limits would allow a range of brightness to be displayed.

Figure 1:
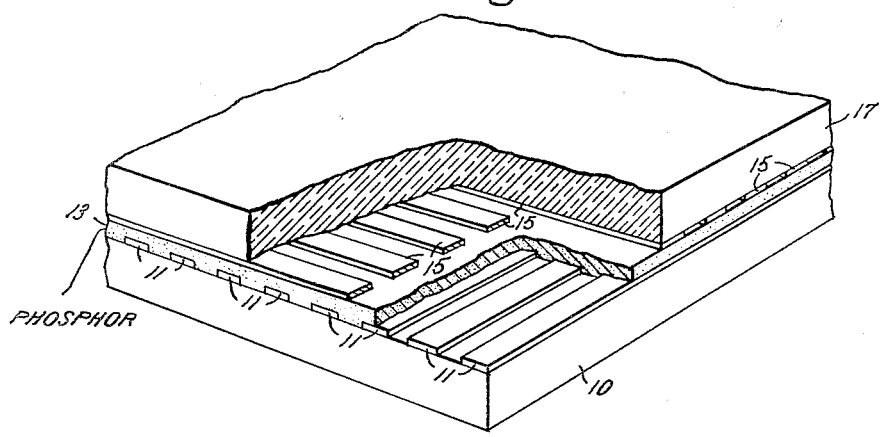
Fig. 1 is a broken perspective view partially in section of a phosphor screen in accordance with this invention.
Figure 2:
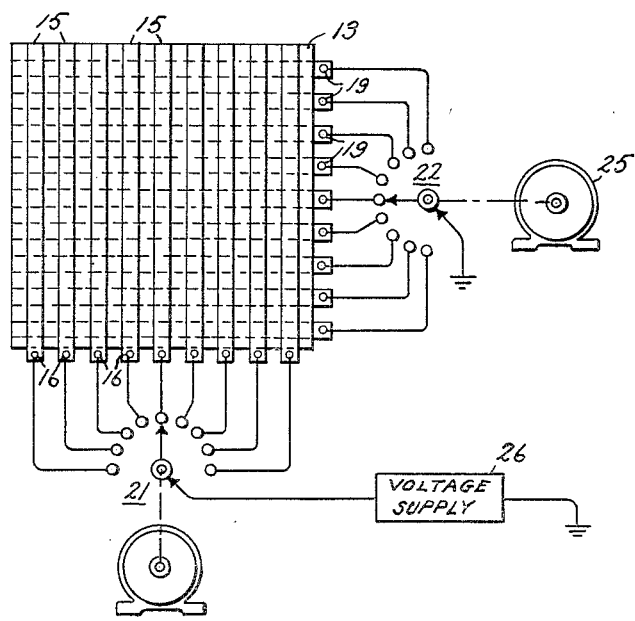
Fig. 2 is a plan view of a phosphor screen made in accordance with this invention illustrating the operation thereof.

In Figs. 1 and 2 a base plate 10, which may be composed of glass or a metal with a coating of insulating material, has a grid of spaced parallel conductors 11 extending transversely thereacross. The conductors 11 may be transparent, but are preferably of metal. They are shown spaced a considerable distance apart for purposes of clarity of illustration, but an actual screen may have as many as a hundred or more conductors to the inch. The layer of conductors may readily be prepared by vacuum coating a metal, such as aluminum, silver, gold, nickel, and others, in a continuous film and then subjecting the base plate 10 to a machine cutting operation to remove a portion of the film of deposited metal to leave a pattern of parallel conductors spaced a short distance from each other. The conducting surface may also be provided by applying a layer of silver paste and removing a part thereof to expose a pattern of grid lines or by applying the paste as a series of parallel lines.

Overlying the grid of conductors 11 is a phosphor layer 13 which may consist of zinc sulfide, zinc oxide, zinc selenide, cadmium sulfide, cadmium selenide, and mixtures thereof, activated with copper, manganese, aluminum, silver, or mixtures thereof. The activators may be present in a concentration as high as 0.90 weight per cent and, in any event, must be present in an amount greater than 0.01 weight per cent. A preferred phosphor is zinc sulfide activated with about 0.3 per cent copper. Other satisfactory phosphors are zinc sulfide activated with 0.15 per cent copper and 0.70 per cent aluminum, as well as zinc fluoride activated with manganese. It is to be understood that this invention is directed generally to electroluminescent phosphors exhibiting light emission which is in phase with the applied potential.

A preferred method of applying the phosphor layer 13 is by the well-known liquid settling process. However, other methods may also be utilized. For example, single crystals may be placed at the intersection of the cross-grid array. Also a fused piece of zinc fluoride may be used.

Overlying the phosphor layer 13 is a grid of conductors 15 similar to the conductors 11 except that they are positioned with their axes at right angles to the axes of the conductors 11 and are preferably transparent. The conductors 15, which are equipped at one end with terminals 16, may be prepared by coating a top plate 17, preferably composed of glass, with a layer of metal so thin as to be virtually transparent. This may be done by a vacuum coating process to apply a continuous very thin film of metal which is then cut to produce the individual conductors 15 by the same method utilized to produce the conductors 11; or the top plate may be treated by exposing it in heated condition to the vapors of silicon, tin, or titanium chlorides, and afterwards placing in a slightly reducing atmosphere. The method disclosed in Cusano and Studer application, Serial No. 243,271, filed August 23, 1951, and assigned to the same assignee as the present application, may be utilized to apply a conducting titanium oxide film. In accordance with this method, the top plate 17 is heated to 150° C. to 200° C. and a titanium oxide film is produced on the plate surface by condensation from an atmosphere containing titanium tetrachloride vapor and water vapor. The continuous transparent conducting film thus produced is subjected to a machining process to cut the film up into a plurality of individual parallel conductors 15. The top plate 17 with its transparent conductors is then placed in contact with the phosphor layer 13.

One end of each set of conductors is exposed and preferably equipped with a set of terminals such as 16 or 19. The terminals 16 and 19 may take the form of contacting surfaces which for some installations must be sufficiently rugged to serve as wiper contacts, or they may be connected by wiring to terminals of a wiper switch.

The various elements of the phosphor screen of Fig. 1 are not shown in true relative size. The base plate 10 and top plate 17 may be as thick, or thicker, than illustrated. However, the grids of conductors 11 and 15 are shown much thicker than need be and the phosphor layer 13 may also be much thinner than illustrated. It may also be individual single crystals.

Fig. 2 illustrates the operation of the screen. In Fig. 2, only the conductors 11 and 15 and phosphor layer 13 are shown and the terminals 16 of conductors 15 are wired to the terminals of a wiper switch 21, and terminals 19 of conductors 11 are wired to the terminals of a wiper switch 22. The contact arm of each wiper switch is rotated by a motor 25. Energy for operating the screen is provided by a direct, alternating or pulsed source of voltage 26, which is normally at a potential of 200 to 2000 volts depending upon the characteristics of the particular elements used.

In operating the device illustrated in Fig. 2, the motors 25 are placed in operation so that the wiper switch contact arms sweep their contacts to selectively energize the conductors 11 and 15. As the conductors 11 and 15 are progressively energized, light is emitted by the phosphor at the point where the particular conductors being energized cross. For example, when the wiper switch contact arms are in the position illustrated in Fig. 2, a point on the phosphor is energized by a circuit consisting of ground, voltage source 26, wiper switch 21, the fifth conductor 15 from the left, phosphor 13, the fifth conductor downward from the top, wiper switch 22, and ground. At the moment the wipers make contact with these conductors, light will be emitted from the phosphor 13 at the point where they cross. A moment later these wipers will have progressed to a point where different conductors will be energized and light will then be emitted at the point where the different conductors cross.

The apparatus of Fig. 2 is a simplified embodiment. Obviously, the intensity of emission may be varied by varying the potential of the voltage source 26 and the position of the emission may be controlled by controlling the movement of the motors 25.

In order for in-phase light to be emitted from the phosphor 13, there must be direct electrode-phosphor contact. Consequently, the phosphor 13 is not suspended in a dielectric and there are no dielectric layers between the phosphor and the conductors 11 and 15. The phosphor layer 13 may be made up of a plurality of single crystals prepared by the method disclosed in my application Serial No. 274,237, filed February 29, 1952, and also single crystals of zinc fluoride-manganese by methods well-known in the art. In accordance with the method of my pending application, single crystals are prepared by the reversible crystallization of activated phosphor material in a sealed tube wherein the phosphor is heated to its melting temperature and a condensing surface is maintained elsewhere in the tube at a temperature about 100° below the melting temperature. By allowing the crystals to grow slowly under reversible conditions large single crystals are formed.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A phosphor screen comprising a first grid of spaced parallel conductors, a second grid of spaced parallel conductors in spaced electrically insulated relationship with said first grid, the conductors of said second grid being axially aligned at substantially a right angle to the axes of the conductors of said first grid, and a phosphor layer positioned between said grids, said phosphor being an electroluminescent phosphor emitting light in phase with the applied voltage.

2. A phosphor screen as claimed in claim 1 in which the phosphor is activated zinc sulfide.

3. A phosphor screen comprising a first grid of spaced parallel conductors, a second grid of spaced parallel conductors in spaced electrically insulated relationship with said first grid, the conductors of said second grid being positioned at substantially a right angle to the conductors of said first grid, and a layer of phosphor positioned between said grids, said phosphor being selected from the group consisting of zinc sulfide, zinc selenide, cadmium sulfide, cadmium selenide, and mixtures thereof, and being activated with from 0.01 per cent to 0.9 per cent of an activator selected from the group consisting of silver, copper, manganese, aluminum, and mixtures thereof.

4. A phosphor screen as claimed in claim 3 in which the activator is copper.

5. A phosphor screen as claimed in claim 3 in which the phosphor is zinc fluoride activated with 0.5–2.0 per cent manganese.

6. A phosphor screen as claimed in claim 3 in which the phosphor is zinc sulfide activated with from 0.01 per cent to 0.5 per cent copper.

7. A phosphor screen as claimed in claim 6 in which the copper activator is present to the extent of 0.3 per cent.

8. A phosphor screen comprising a first grid of spaced parallel conductors, a second grid of spaced parallel conductors in spaced electrically insulated relationship with said first grid, the conductors of said second grid running at substantially a right angle with the conductors of said first grid, means for selectively completing an electrical circuit through one end of said conductors and a phosphor layer positioned between said grids, said phosphor being selected from the group consisting of zinc sulfide, zinc selenide, cadmium sulfide, cadmium selenide, and mixtures thereof.

9. Apparatus as claimed in claim 8 wherein the electrical circuit completing means generates an electron flow through said phosphor.

10. A phosphor screen comprising a first grid of spaced parallel metallic conductors, a second grid of spaced parallel transparent conductors in spaced electrically insulated relationship with said first grid, the conductors of said second grid running at substantially a right angle to the conductors of said first grid, and a phosphor layer positioned between said grids, said phosphor being selected from the group consisting of activated zinc sulfide, zinc selenide, cadmium sulfide, cadmium selenide, and mixtures thereof.

11. A phosphor screen comprising a first grid of spaced parallel conductors, a second grid of spaced parallel conductors in electrically insulated relationship with said first grid, the conductors of said second grid running at substantially a right angle to the conductors of said first grid, and a phosphor layer positioned between grids, said phosphor being selected from the group consisting of zinc sulfide, zinc selenide, cadmium sulfide, and mixtures thereof, and a source of current for energizing said conducting grids, said current being at a potential slightly above the in-phase emission threshold voltage of said phosphor.

12. An electroluminescent screen comprising a layer of a phosphor which emits light in phase with an applied electric field, a first grid composed of a plurality of non-intersecting conductors contacting one surface of said layer, a second grid composed of a plurality of non-intersecting conductors contacting the opposite surface of said layer, said grids being so oriented that projections of both grid structures form an intersecting pattern and switching means for selectively applying a voltage at least slightly above the in-phase emission threshold voltage of said screen to said conductors.

13. The electroluminescent screen of claim 12 wherein the applied voltage does not exceed the in-phase emission threshold voltage by more than 40 per cent.

No references cited.